May 7, 1968     J. P. VILAGOS ET AL     3,381,832
TIPPER UNLOADER FOR DRAGLINE CARTS
Filed June 13, 1966     4 Sheets-Sheet 1
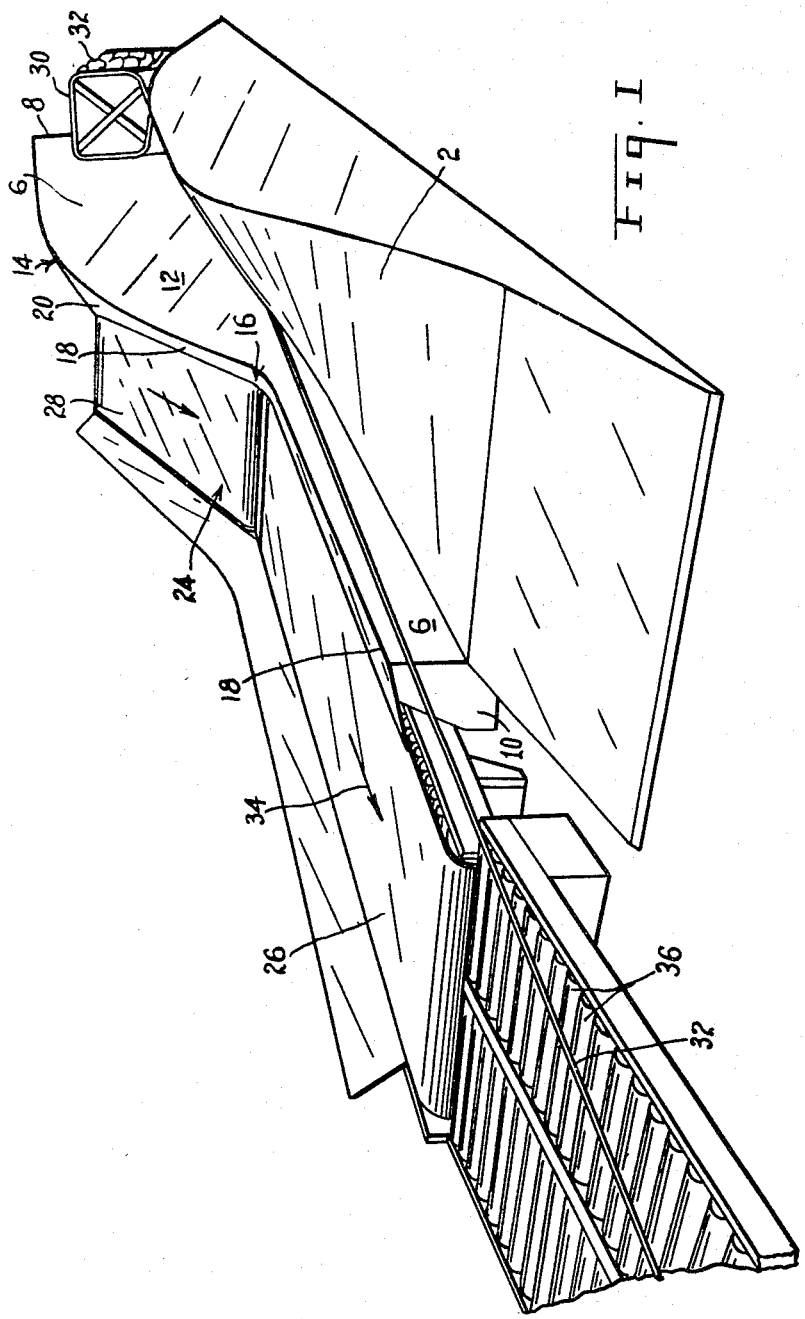
INVENTORS
J. P. VILAGOS
W. BOWLER
Fetherstonhaugh & Co.
ATTORNEYS

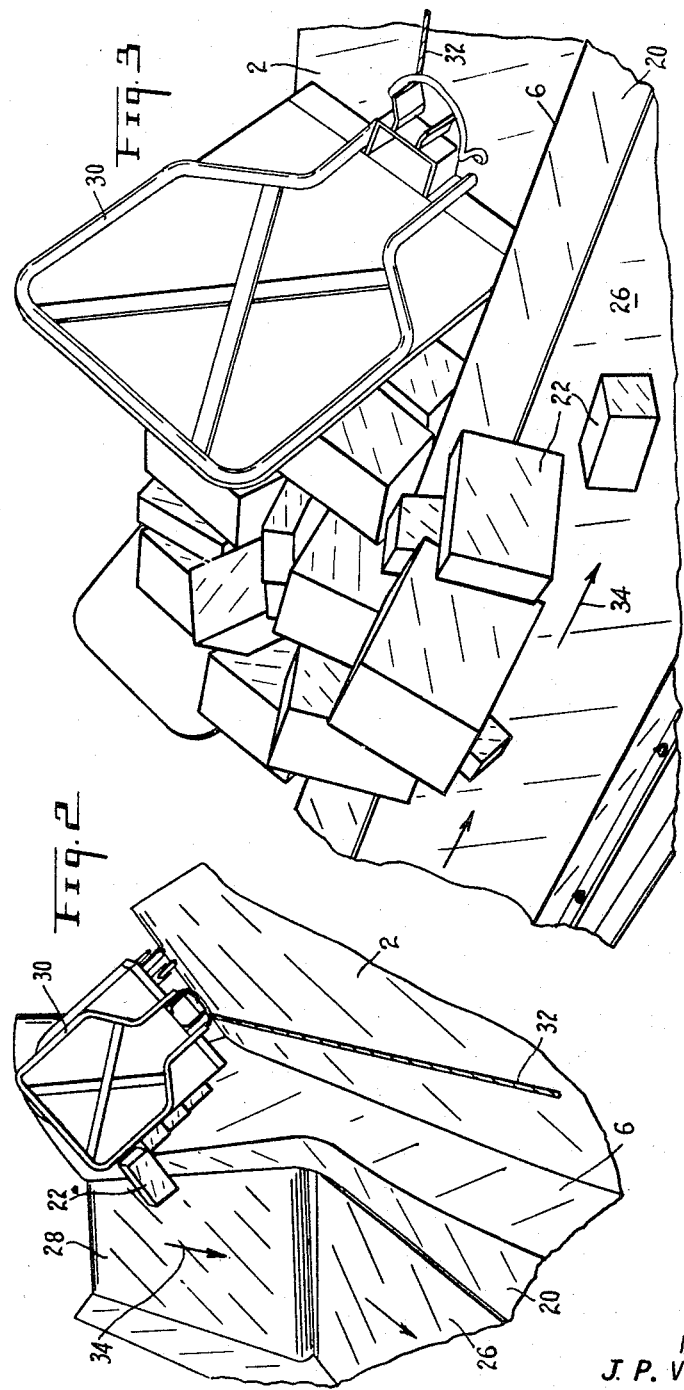

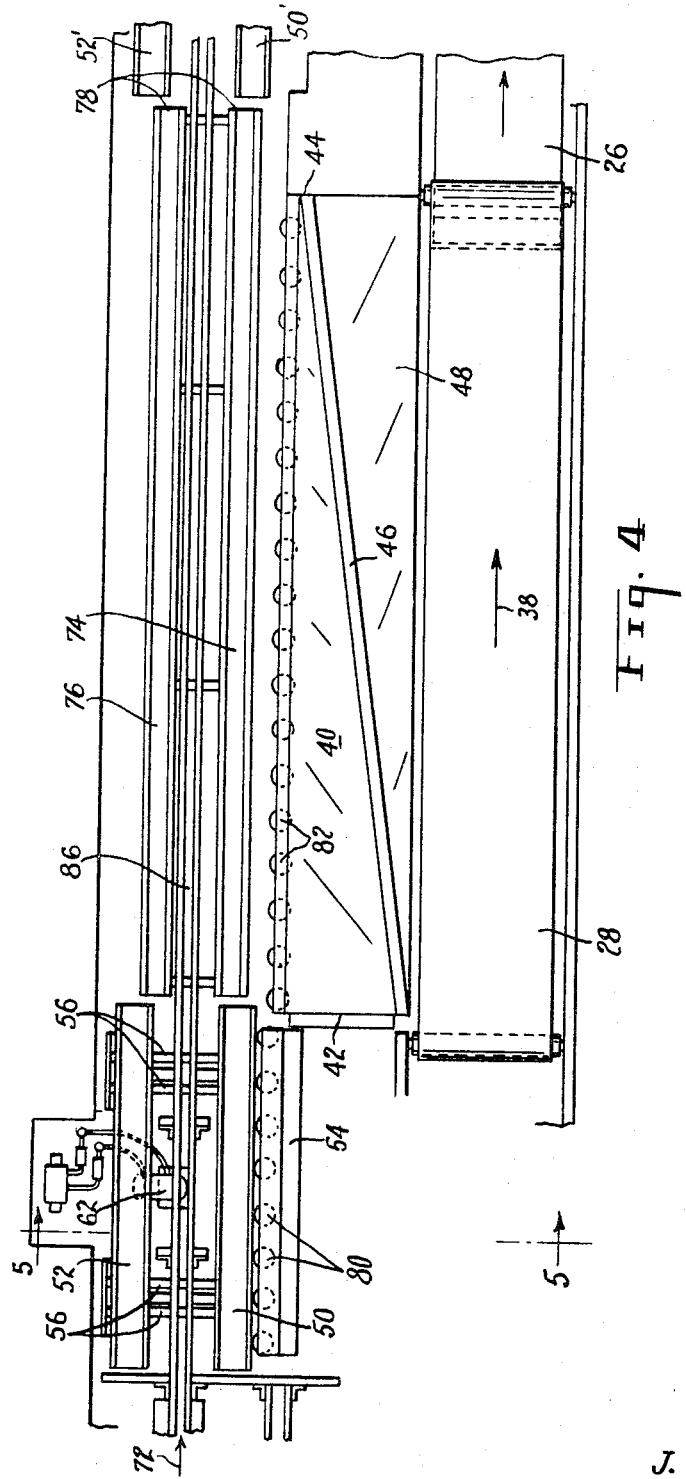

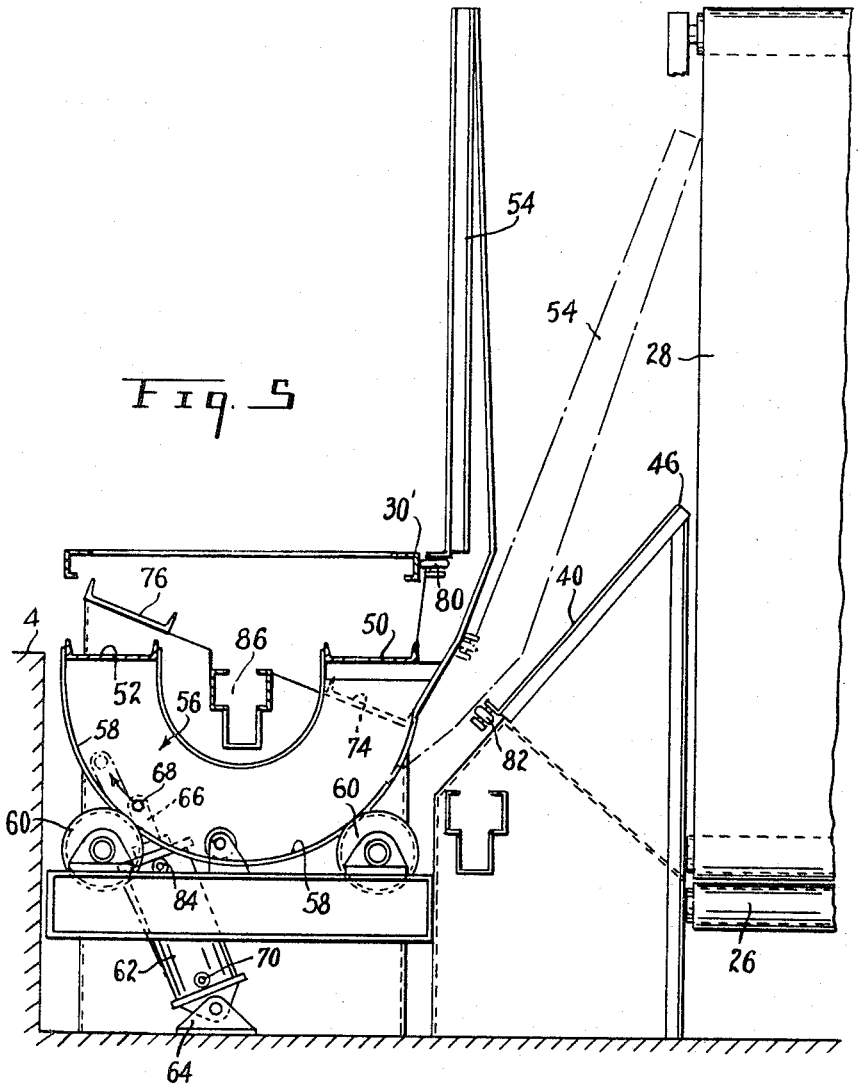

United States Patent Office 3,381,832
Patented May 7, 1968

3,381,832
TIPPER UNLOADER FOR DRAGLINE CARTS
Joseph P. Vilagos, Cooksville, Ontario, and William Bowler, St. Laurent, Quebec, Canada, assignors to Canadian National Railway Company, Montreal, Quebec, Canada
Filed June 13, 1966, Ser. No. 557,247
10 Claims. (Cl. 214—46)

The present invention relates to an apparatus for unloading a cart, and particularly to apparatus for quickly, gently and automatically unloading a dragline cart having open sides.

In recent years, extensive use has been made of draglines for conveying small wheeled carts from one section of a warehouse or freight shed to another to speed up loading and unloading. Frequently, parcels require sorting for various destinations which necessitates the cart being moved to a sorting area where the parcels can be handled individually. These drag lines consist usually of a moving endless chain set into the floor and running around the outer periphery of the building. In cases where a truckload of parcels cannot be handled by the staff at a given location, the cart continues around the building and is unloaded the next time that it arrives at the station. Switches have been developed for diverting the carts into the required locations but in the case of parcels requiring sorting, the cart must first be unloaded and then the parcels sorted.

The present invention relates to an apparatus for unloading a cart containing parcels for sorting onto a conveyor belt aligned parallel with the line of movement of the cart, automatically and without stopping the cart, and avoiding damage to the parcels or contents which will occur if the cart is simply overturned or the parcels are pushed off the cart.

This invention provides means for automatically unloading a dragline cart without damage to the parcels or contents, by providing means for tilting an open-sided cart against a smooth inclined wall section the height of which wall diminishes along its length, and means for pulling the cart along the wall to discharge (by gravity) successive layers of parcels over the top edge of the inclined wall and onto an inclined belt conveyor system. With these means it is possible to unload a cart automatically and without stopping the cart and with minimum damage to the parcels.

It is the main object of the present invention then to provide means for gently and automatically unloading an open-sided cart by tilting a loaded cart against a smooth inclined wall section of decreasing height along its length and pulling the cart along the wall to discharge successive layers of parcels over the top of the wall and onto a belt conveyor aligned parallel or perpendicular with the line of movement of the cart and inclined either in the same direction as the decreasing wall height or in the opposite direction; and to provide method and means for tilting the cart against the inclined wall.

These and other objects will become apparent from the following description in conjunction with the accompanying drawings wherein:

FIGURE 1 illustrates in perspective view the unloading principle of the present invention and shows a loaded dragline cart being pulled up a raised and inclined ramp portion which will tip the cart against the inclined wall portion and the packages discharged on the belt conveyor arrangement;

FIGURE 2 illustrates a partial view of the showing in FIG. 1 but wherein the dragline cart is further up the raised and inclined ramp and the topmost parcels on the cart are being discharged over the top edge of the inclined wall onto the belt conveyor;

FIGURE 3 illustrates in perspective view the dragline cart substantially fully tilted with respect to the inclined wall and belt conveyor and showing the bulk of the parcels carried on the cart being discharged onto the belt conveyor;

FIGURE 4 illustrates in top plan view the belt conveyor system and inclined wall arrangement of the present invention and showing other means for tilting a loaded dragline cart against the inclined wall; and FIGURE 5 illustrates in sectional end view the tilting arrangement shown in FIG. 4, and is a view taken along line 5—5 of FIG. 4.

In FIG. 1 a raised and inclined ramp section 2 is shown positioned on the floor 4 of a freight shed or warehouse. Provided immediately adjacent and longitudinally parallel to the cart tilting ramp 2 is a wall section 6. The surface of wall 6 adjacent the tilting ramp 2 is substantially vertical at its ends 8 and 10, but the angle of inclination from the vertical of the wall surface uniformly increases from the ends 8 and 10 to its center (generally indicated at 12) where it may have an inclination of as much as 45°. The inclination of the wall surface 6 is substantially proportional to the inclination of the ramp section 2, the angle formed between the surface of the wall 6 and the surface of the ramp 2 being substantially 90° at all times.

The height of the wall 6 at its end 8 is greater than the height at 10 as is clearly shown in FIG. 1, with the major decrease in height occurring between 14 and 16 in the area of maximum inclination of wall 6 and maximum inclination of ramp 2.

The conveyor belt system 20 is arranged parallel with the ramp 2, wall 6 and sloping surface 20, and immediately adjacent sloping slide surface 20.

The belt conveyor consists of two more individual belt sections which substantially follow the contour of the upper edge 18 of the wall 6. One belt section positioned in a substantially horizontal plane is shown at 26 in FIG. 1, and a second belt section 28 is inclined following the angled wall portion 14–16. This arrangement of belts 26 and 28 ensures that the width of the sloping surface 20 is substantially constant throughout its length and that the parcels being discharged from the cart do not have far to travel nor too steep a drop to the belt conveyors.

In FIG. 1 a cart 30 carrying parcels is being pulled onto ramp 2 by a dragline 32. FIG. 2 illustrates the cart positioned further along on the ramp and inclined against and supported by wall 6. The tilting of the cart 30 by ramp 2 is sufficient to cause the parcels to slide off the cart but this sliding is prevented by wall 6. As the height of wall 6 decreases between points 14 and 16 the restraining influence of the wall against the uppermost parcels on the cart ceases to exist and the uppermost parcels slide over edge 18 down sloping surface 20 and onto belt conveyor 28 (see FIG. 2). As the cart is pulled further along ramp 2 and as the height of the wall 6 decreases successive layers of parcels slide gently onto belt 28 (see FIG. 3) until the cart is completely unloaded as will happen when the tilted cart is pulled past wall point 16. The conveyor belting conveys the parcels in the same direction as the movement of the cart 30 and in the direction of arrows 34 in FIGS. 1, 2 and 3, but at a faster speed than the cart is moving to prevent a pile-up of parcels on the belt. The parcels deposited upon the conveyor belts 26 and 28 are then conveyed to a sorting station by other conveying means such as by a train or rollers 36 shown in FIG. 1.

Another arrangement for tilting a cart for unloading purposes is shown in FIGS. 4 and 5, and while the unloading apparatus consists of an inclined wall surface against which the cart and parcels rest prior to discharge, and an inclined conveyor belt system, the wall of FIGS. 4 and 5 has a constant inclination as opposed to the varied inclination of the wall of FIGS. 1, 2 and 3.

FIG. 4 illustrates in top plan view the unloading apparatus according to the second embodiment of the present invention. Numeral 28 indicates an inclined conveyor belt identical with the belt 28 shown in FIG. 1, the travel and pitch of the belt 28 is indicated by arrow 38. A substantially horizontal belt conveyor 26 is shown as in FIG. 1.

In the embodiment according to FIG. 1 an inclined wall surface 40 runs substantially parallel with the inclined conveyor 28, but unlike wall 6 in FIG. 1, wall 40 has a constant inclination throughout its length and the height of the inclined wall 40 decreases uniformly from its front end 42 to the rear end 44. The uppermost edge of wall 40 is shown by numeral 46 and between the conveyor belt 28 and edge 46 is a sloping surface 48 down which parcels slide to the conveyor after being discharged from the cart.

In FIGS. 1, 2 and 3, the cart 30 is tilted by pulling the cart over a raised and tilted ramp 2, but a different tilting arrangement is employed in FIGS. 4 and 5. As the wheeled cart is pulled over the floor the wheels are directed onto track segments 50 and 52 (mounted flush with the floor) which are integrally mounted and are pivotable from a horizontal position to a planar position of substantially 90° with respect to the angle of inclination of wall 40. The track segment pivoting combination is provided with a flat upstanding side support plate 54 which is integrally secured to track segments 50 and 52 and which when track segments 50 and 52 pivot from the horizontal will incline at the forward end of wall 40 to form a forward extension thereof. In FIG. 5 the upstanding side support plate 54 is integrally fixed to semicircular track segment supports 56 which also firmly support track segments 50 and 52. The lowermost arcuate surface 58 of the track segments 56 rests on the rollers 60. The track segment supports are mounted for rotation on the rollers 60 from the track horizontal position shown in full lines in FIG. 5 to an inclined position shown in broken lines.

The rotation of the track segment supports 56 is effected by hydraulic or pneumatic cylinder 62. The cylinder section of the cylinder 62 is pivotally mounted on the floor bracket 64 and the end of the associated piston rod 66 is connected to track segment supports 56 as at 68. Activation of the cylinder 62 by the injection of air or fluid into port 70 will cause rotation of the track segment supports 56, track segments 50 and 52 and the side support plate 54 from the full-line position to the dotted line position as indicated by the broken line position of the side support plate 54.

The track segments 50 and 52 in the full line position shown in FIG. 5 are mounted flush with the floor level 4 of the freight shed or warehouse, and a wheeled cart can easily be dragged (in the direction of arrow 72 in FIG. 4) onto the then horizontally positioned track segments. Once all of the wheels of the cart are positioned in the track segments 50 and 52, the cylinder 62 is activated either manually or automatically to rotate the track segment supports 56 from the horizontal position to the inclined position wherein the support plate 54 is positioned flush with the end of inclined wall 40 and at equal inclination.

The cart is continuously moved further along on the track segments 50 and 52 and the wheels of the cart roll off the ends of track segments and onto fixed track portions 74 and 76 which are also inclined to maintain the cart and the parcels thereon in contact with wall 40. The cart is pulled along inclined track portions 74 and 76 with the parcels in contact with the wall 40 and the cart is unloaded in the manner described for FIGS. 1, 2 and 3 above. When the unloaded cart reaches the end 78 of track portions 74 and 76 the cart rolls onto rotatable track segments 50' and 52' which is an arrangement similar to that described with reference to track segments 52 and 54, and which is operable by hydraulic or pneumatic means (not shown) to pivot from an inclined to a horizontal position returning the cart to an upright position from where it is pulled away from the unloading arrangement.

In order that the inclined cart may more easily be pulled along from rotatable track segments 50 and 52 and along the inclined wall 40, roller wheels 80 and 82 may be arranged as shown. In FIG. 5 a roller wheel 80 is shown in contact with a portion 30' of a cart.

As a loaded cart is pulled from inclined track segments 50 and 52 and onto track portions 74 and 76, the hydraulic cylinder 62 will again be activated by the injection of fluid or air onto port 84 to return the track segments to their horizontal position to receive another cart for unloading purposes.

In some freight sheds and warehouses the floor may be provided with an endless chain set in a track or groove into which a downwardly projecting lug carried by a cart is positioned to propel and maintain the cart on a preselected course. Such a track or groove is shown at 86 in FIGS. 4 and 5.

In the above described apparatus the belt conveyors are shown inclined in the direction of travel of the cart. The invention can operate equally well with the belt conveyor travelling in a direction opposite to that of the cart.

The foregoing disclosure describes apparatus for unloading a cart by tilting the cart against and pulling the cart along an inclined wall of diminishing height to discharge (by gravity) successive layers of parcels gently upon an inclined belt conveyor system which is moving at a speed faster than the speed at which the cart is pulled. Two ways of tilting the cart have been disclosed but the inventive feature should not be limited to any specific tilting arrangement but only to the scope of the appended claims.

What we claim is:

1. Apparatus for unloading an open-sided cart on which parcels are arranged in superimposed layers, comprising an inclined wall surface of gradually decreasing height toward one end thereof, means for tilting the cart against said inclined surface, means for moving the tilted cart along the length of the wall in the direction of the end of the wall toward which the height of the wall decreases to effect discharge of successive layers of parcels from the cart over the top of the wall and an inclined conveyor positioned adjacent said wall parallel to the direction of travel of the cart and upon which the parcels discharged over the top of said wall are deposited.

2. Apparatus as set forth in claim 1, including means for operating the inclined conveyor at a speed in excess of the speed of travel of the cart along said wall.

3. Apparatus as set forth in claim 1, wherein the angle of inclination of said inclined wall and the angle of tilt of the cart are both constant and wherein the height of said wall decreases uniformly.

4. Apparatus as set forth in claim 1, wherein the conveyor is inclined in the same direction as that in which the height of the wall decreases.

5. Apparatus as set forth in claim 1, including a sliding surface sloping downwardly from the top of said wall to the adjacent edge of the inclined conveyor belt.

6. Apparatus according to claim 1, including tracks along which the cart travels in the lengthwise direction of said wall, the inclination of said tracks being such that they lie at an angle of about 90° to the inclined wall.

7. Apparatus according to claim 1, wherein the angle of inclination of said wall varies along its length and the angle of tilt of the cart varies proportionately with the inclination of the wall.

8. Apparatus according to claim 1, comprising a raised and tilted ramp positioned parallel with the said wall and over which the cart is moved and by means of which the cart is tilted against the wall.

9. Apparatus according to claim 1 in which the means for tilting the cart includes a pair of track segments pivotable from a horizontal position to a planar position of substantially 90° with respect to the angle of inclination of the said inclined surface, one of said pair of track segments being located adjacent each end of the said inclined surface, and an intermediate length of track between each pair of track segments, the said length of track having an inclination to the horizontal to maintain the said cart titled against said inclined surface during the travel of the cart between the pair of track segments.

10. Apparatus according to claim 9 in which a first of said pair of track segments receives the cart and tilts the cart from a horizontal position to an inclined position against the said inclined surface and in which the second of said pair of track segments receives the cart from said intermediate length of track and tilts it back to a horizontal position.

References Cited

UNITED STATES PATENTS

| | | | |
|---|---|---|---|
| 1,135,669 | 4/1915 | Culemeyer | 214—62 |
| 2,290,844 | 7/1942 | Smith | 214—44 XR |

ROBERT G. SHERIDAN, *Primary Examiner.*